United States Patent [19]

Ohmiya

[11] Patent Number: 5,768,636
[45] Date of Patent: Jun. 16, 1998

[54] VARIABLE-FOCUS PHOTOGRAPHIC CAMERA

[75] Inventor: Akio Ohmiya, Ohmiya, Japan

[73] Assignee: Fuji Photo Optical Co., Ltd., Japan

[21] Appl. No.: 784,029

[22] Filed: Jan. 15, 1997

[30] Foreign Application Priority Data

Jan. 16, 1996 [JP] Japan ................... 8-023174
Jan. 29, 1996 [JP] Japan ................... 8-033124

[51] Int. Cl.$^6$ .................................... G03B 17/00
[52] U.S. Cl. .................................... 396/85; 396/539
[58] Field of Search .................... 396/85, 84, 539

[56] References Cited

U.S. PATENT DOCUMENTS

| | | | |
|---|---|---|---|
| 4,351,598 | 9/1982 | Suzuki et al. | 396/539 |
| 4,827,296 | 5/1989 | Haraguchi et al. | 396/85 |
| 5,079,584 | 1/1992 | Nakamura | 396/539 |
| 5,606,389 | 2/1997 | Sugita | 396/539 |
| 5,634,147 | 5/1997 | Machida | 396/85 |

FOREIGN PATENT DOCUMENTS

| | | |
|---|---|---|
| 5-80244 | 4/1993 | Japan. |
| 7-128567 | 5/1995 | Japan. |

*Primary Examiner*—Russell E. Adams
*Attorney, Agent, or Firm*—Price, Heneveld, Cooper, DeWitt & Litton

[57] ABSTRACT

A variable-focus photographic camera is described having a photographic lens adapted to be driven by an electric motor disposed at a location as remote as possible from the photographic lens so that a group of elements serving to transmit a driving force from a drive source to the photographic lens can be arranged substantially in a common plane and thereby a thickness or depth, as viewed in the direction of the optical axis of a space destined to be occupied by the above-mentioned group of elements, can be reduced. Such an arrangement also positively contributes to realization of a thin and compact camera. A dry battery and a main capacitor for powering a strobe device are disposed on the same lateral side of a camera body. The electric motor is disposed below on the dry battery and an output shaft of the electric motor is oriented in parallel to the optical axis of the photographic lens. Respective gears of a gear train arranged in a central zone of the camera body between the electric motor and the photographic lens, have their shafts extending in parallel to the optical axis. In this manner, the thickness or depth, as viewed in the direction of the optical axis of the space occupied by the gear train arranged in a common plane, can be minimized and thereby a thickness of the camera can be correspondingly reduced.

27 Claims, 6 Drawing Sheets

VARIABLE-FOCUS PHOTOGRAPHIC CAMERA

BACKGROUND OF THE INVENTION

The present invention relates to a variable-focus photographic camera having a driving mechanism for a photographic lens incorporated with a variable-focus lens system adapted to drive the photographic lens back and forth in the direction of an optical axis either in a power varying mode or in a focusing mode, and more particularly to a variable-focus photographic camera having a built-in strobe device for photographing at a low luminance characterized by an efficient placement of components such as a battery source and the electric motor used to drive the photographic lens.

As photographic cameras become more popular, marketing trends require that cameras should be more and more compact, thin, and lightweight and simultaneously contain a power varying mechanism such as a zoom mechanism or focus change-over mechanism and a built-in strobe device for photographing at a low luminance. The power varying mechanism functions to move the photographic lens back and forth in a direction parallel to an optical axis, for example, to move the photographic lens outward with respect to a camera body for telephoto, and move the photographic lens back toward the camera body for wide-angle or standard photo. Thus, a lens barrel holding the photographic lens is moved back and forth relative to the camera body in parallel to the optical axis.

A driving force of an electric motor has conventionally been utilized as the drive source for moving the photographic lens back and forth and a gear train has typically been employed as the transmission elements serving to transmit the driving force from the electric motor to the photographic lens. In a variable-focus photographic camera of this type, placement of the electric motor has been preferential and, for example, the zoom motor described in Japanese Patent Application Disclosure Gazette No. 1993-80244 is disposed in the proximity of the photographic lens.

The built-in strobe device makes it necessary to incorporate a main capacitor used to power the strobe device. Additionally, a battery source for this strobe device, as well as for the electric motor, must be loaded in the camera. These batteries and main capacitor are of relatively large size and placement of them necessarily affects realization of a compact camera. Conventionally, the main capacitor is placed adjacent the strobe flash window and the battery source is placed on the side opposite the main capacitor with the photographic optical system therebetween.

In the conventional variable-focus photographic camera, the battery source and the main capacitor are placed on laterally opposite sides of the camera with the photographic lens therebetween, and the electric motor is placed in the proximity of the photographic optical system with a result that these components of relatively large sizes are placed apart one from another. Such arrangement of the components is disadvantageous for miniaturization of the camera.

In the conventional camera having the variable-focus lens system such as power varying mechanism, the viewfinder's power is synchronously varied as the photographic lens is driven for power variation and a drive source for the photographic lens is used also for this power variation of the viewfinder. Specifically, the driving force for the viewfinder's optical system is obtained from an intermediate point on the path along which the driving force is transmitted from the drive source to the photographic lens. When the transmission path comprises a gear train, a separate transmission path is branched from an intermediate gear of the gear train so that one of these two gear trains may serve to drive the photographic optical system while the other may serve to drive the viewfinder's optical system. These two gear trains are combined with each other at a given velocity ratio so that both the photographic optical system and the viewfinder's optical system may operate in predetermined manners, respectively. To this end, these two gear trains comprise predetermined numbers of gears, respectively.

As will be apparent from the foregoing description, it is necessary for the conventional construction to use the gear trains each comprising a predetermined number of gears and, to meet such requirement, the gears are supported so that several gears necessarily overlap in the direction of the optical axis. As a consequence, a thickness or depth, as viewed in the direction of the optical axis of a space occupied by the gear trains, correspondingly increases and prevents a desired miniaturization of the camera from being realized.

SUMMARY OF THE INVENTION

An aspect of the present invention is to provide a variable-focus photographic camera including its relatively large-sized components such as a battery and an electric motor arranged as efficiently as possible so as to contribute to miniaturization of the camera. Another aspect of the present invention is to provide a variable-focus camera wherein the elements serving to transmit the driving force from an electric motor to the photographic optical system are arranged substantially in a common plane so as to facilitate realization of a thin camera.

To achieve these and other aspects and advantages, the variable focus photographic camera of the present invention comprises a camera body covered by a camera casing; a photographic optical system adapted to operate in either a power varying mode or a focusing mode by moving a photographic lens back and forth in the direction of an optical axis; a strobe device; a battery source disposed within the camera casing on one lateral side of the camera body for providing power to components of the camera for the performance of various operations; a main capacitor coupled to the battery source and disposed adjacent the battery source within the camera casing on one side of the camera body, for providing power to the strobe device; and a drive source disposed in a space defined between the camera casing and the battery source and main capacitor, for driving the optical system back and forth in the direction of the optical axis.

In view of a fact that the battery source and the main capacitor are relatively large-sized components compared to the remaining components of the camera, the battery source and main capacitor may be placed on the same lateral side of the camera body to obtain a space between the battery and main capacitor and a casing covering the camera body. By disposing the drive source of the photographic lens within this space, it is possible to dispose the relatively large-sized components efficiently within the camera body. Additionally, a plurality of elements serving to transmit the driving force at a predetermined velocity ratio from the drive source to the photographic lens can be advantageously arranged substantially in a common plane because the drive source is placed at a location remote from the photographic lens. Accordingly, a thickness or depth, as viewed in the direction of the optical axis, of the space occupied by these elements of the driving force transmission path can be minimized to facilitate realization of the thin camera.

In view of the fact that the space defined between the battery source and main capacitor and the casing may be formed below or above the battery source and main capacitor, the drive source may be provided above or below the battery and the main capacitor. In the camera body, the location lying below or above the lateral side of the camera body is the most remote from the photographic lens and optimal to assure an adequate distance from the drive source to the photographic lens as well as an adequate space for placement of the drive source. By providing the drive source above or below the battery and main capacitor, the drive source is sufficiently spaced from the photographic optical system and thereby a correspondingly sufficient space is available to arrange the elements used to transmit the drive force therebetween.

As an advantageous consequence of this arrangement, the elements serving to transmit the driving force from the drive source to the photographic optical system have their supporting shafts arranged in parallel to the optical axis of the photographic optical system. To be arranged within such sufficient space, the elements for transmission are preferably implemented in the form of a gear train.

By orienting the shafts supporting the respective gears of the gear train in parallel to the optical axis of the photographic optical system, the driving force transmission path comprising these elements (i.e., the gear train) can be arranged substantially in a common plane. As a result, the thickness or depth, as viewed in the direction of the optical axis of the space occupied by this driving force transmission path can be reduced and further miniaturization of the camera can be accomplished. Particularly, by employing the gear train as the driving force transmitting elements, they can be easily arranged substantially in a common plane.

Preferably, the battery source for powering various operations of the camera and the main capacitor for powering the strobe device are disposed outside a spool chamber or a patrone chamber of the camera body.

The features and advantages of the invention as well as additional aspects, may be realized and obtained by means of the instrumentalities and combinations particularly pointed out in the written description and claims hereof as well as the appended drawings.

DETAILED DESCRIPTION OF THE PREFERRED EMBODIMENTS

Specific details of the variable-focus photographic camera according to the present invention will be more fully understood from the following description of the preferred embodiments made in reference with the accompanying drawings.

Figure 1:
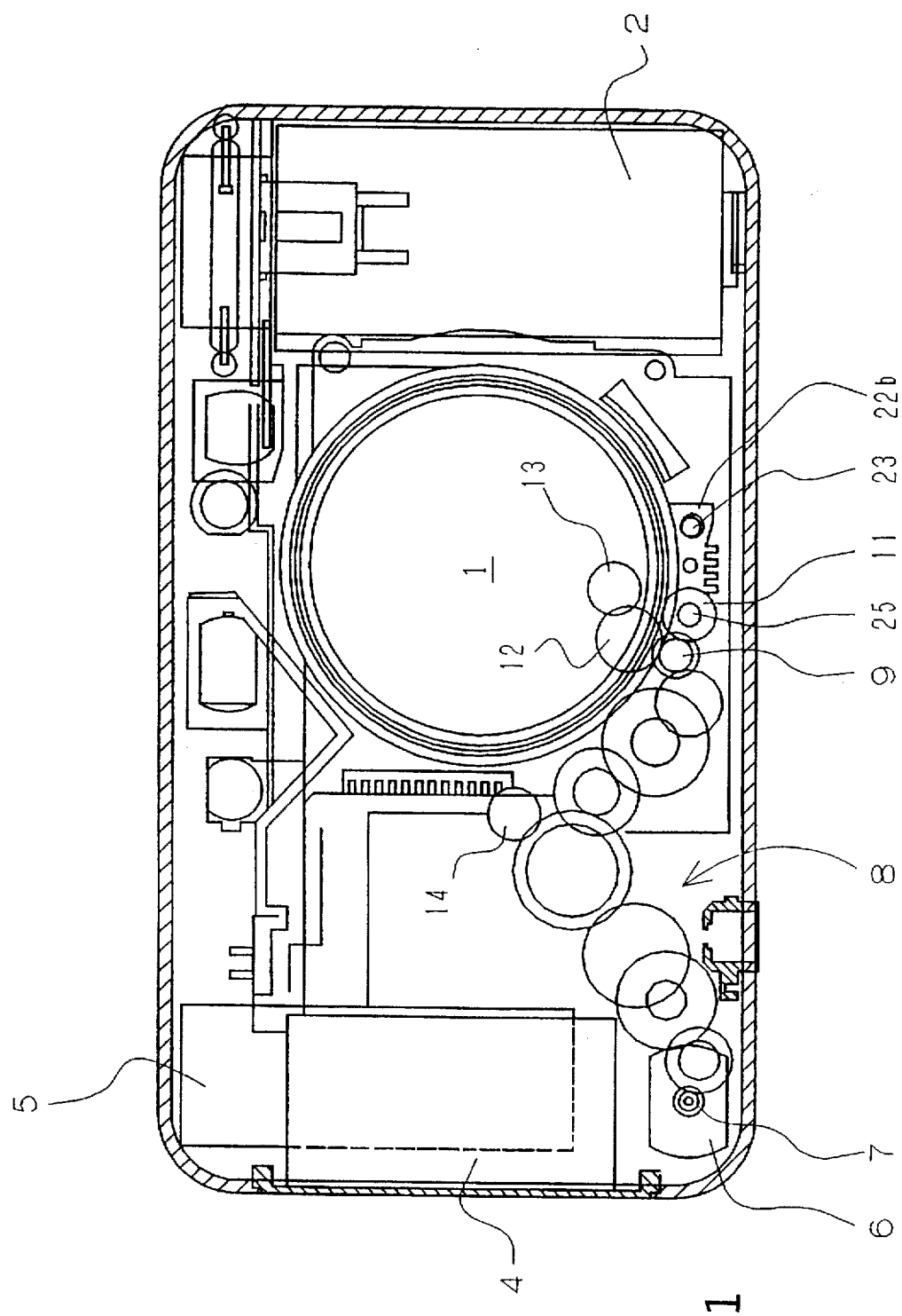
FIG. 1 is a sectional view taken along a vertical plane extending adjacent a rear side of the inventive variable-focus photographic camera.
Figure 2:
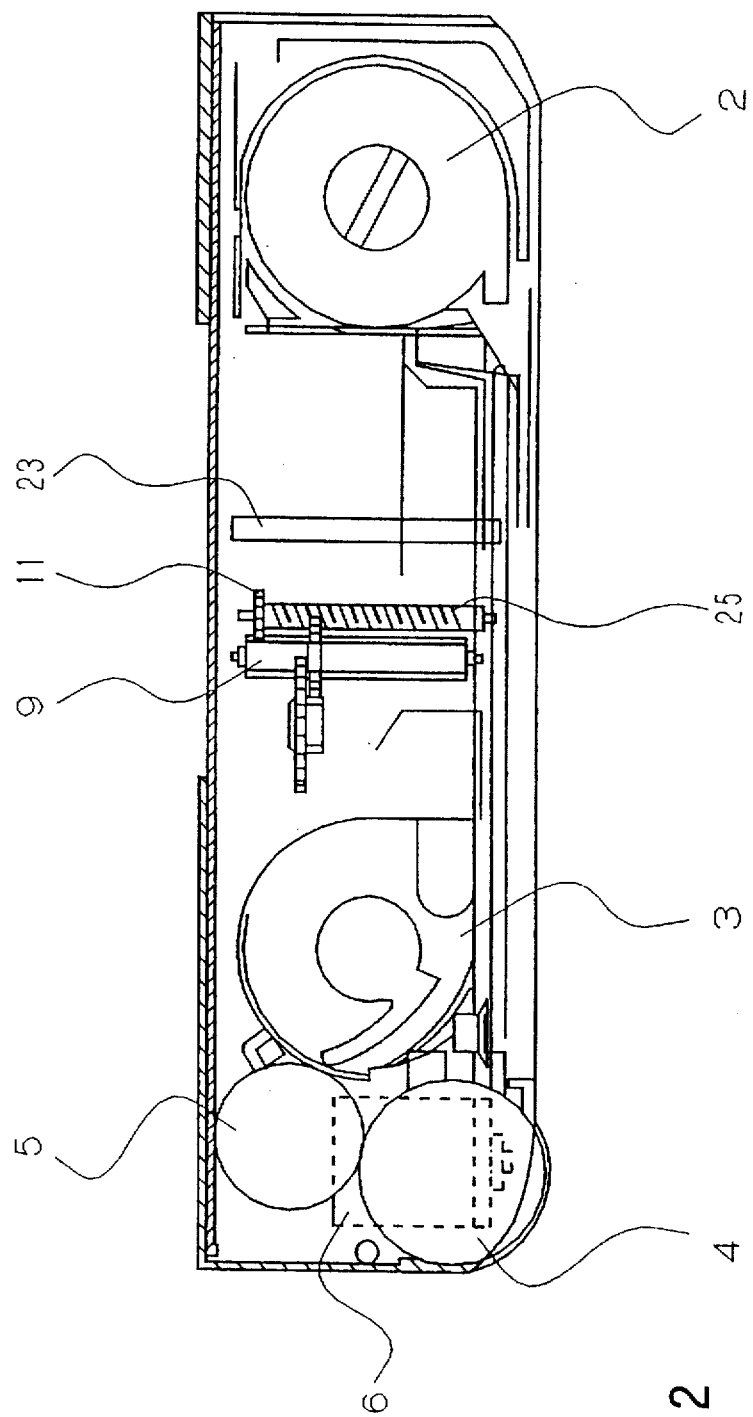
FIG. 2 is a sectional view taken along a horizontal plane extending adjacent a top side of the inventive variable-focus photographic camera.

FIG. 1 is a sectional view taken along a vertical plane extending adjacent a rear side of the variable-focus photographic camera of the present invention, and FIG. 2 is a sectional view taken along a horizontal plane extending adjacent a top side of this camera. On both sides of a camera body, there are provided a patrone chamber 2 and a spool chamber 3, respectively, with a photographic lens 1 therebetween. The camera body further includes, in a region defined between spool chamber 3 and the adjacent lateral end of the camera body, a dry battery 4 serving as a power source and a main capacitor 5 for powering a strobe circuit. Below dry battery 4, there is provided an electric motor 6 used to drive elements such as the lens barrels. More specifically, this electric motor 6 is located at the greatest possible distance within the camera body from photographic lens 1. While this specific embodiment is described here as having dry battery 4, main capacitor 5, and electric motor 6 located outside spool chamber 3, these elements may be located outside patrone chamber 2 rather than spool chamber 3 on the other side of the camera body where electric motor 6 would be adequately spaced from photographic lens 1.

In this embodiment, electric motor 6 has its output shaft extending in parallel to the optical axis of photographic lens 1 and a lens barrel driving gear 9 is operatively associated via a gear train 8 functioning as a power transmitting element with a pinion 7 fixed on the output shaft of motor 6. It should be understood that respective shafts carrying pinion 7 and gear train 8 also extend in parallel to the optical axis of photographic lens 1. Each tooth of lens barrel driving gear 9 has a thickness substantially defined by a full length of its shaft and extends in parallel to the optical axis as shown by FIG. 2. Lens barrel driving gear 9 is engaged with a first driving gear 11, and a driving force transmission gear 12. As will be seen in FIGS. 1 and 3, driving force transmission gear 12 is, in turn, engaged with a second driving gear 13 which is mounted on the rear end of the first driving lens barrel as described below, so as to be rotatable around an axis extending in parallel to the optical axis S. It should be understood that, as shown by FIG. 1, a transmission gear 14 is engaged with an intermediate gear included in the gear train 8 and an appropriate gear train (not shown) is operatively associated with the transmission gear 14 to provide a driving force for a power varying mechanism of a viewfinder included within the camera.

Figure 3:
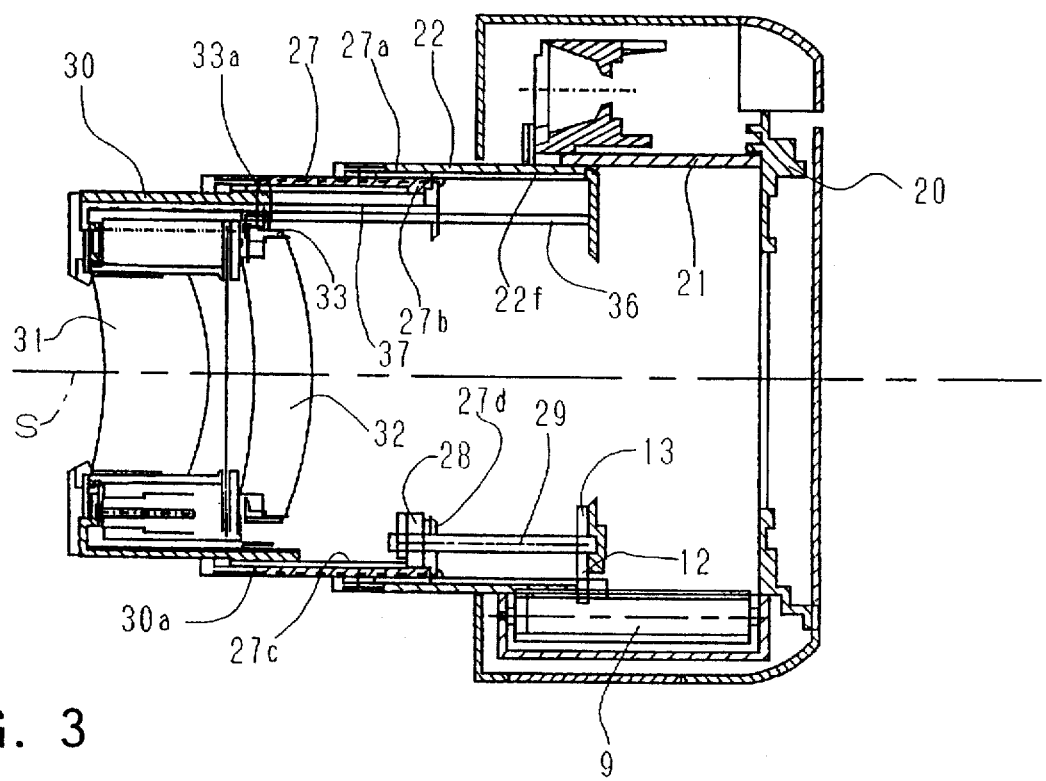
FIG. 3 is a sectional view taken along a vertical plane including an optical axis of the photographic lens, showing the inventive variable-focus photographic camera as the photographic lens has moved to its foremost position.
Figure 4:
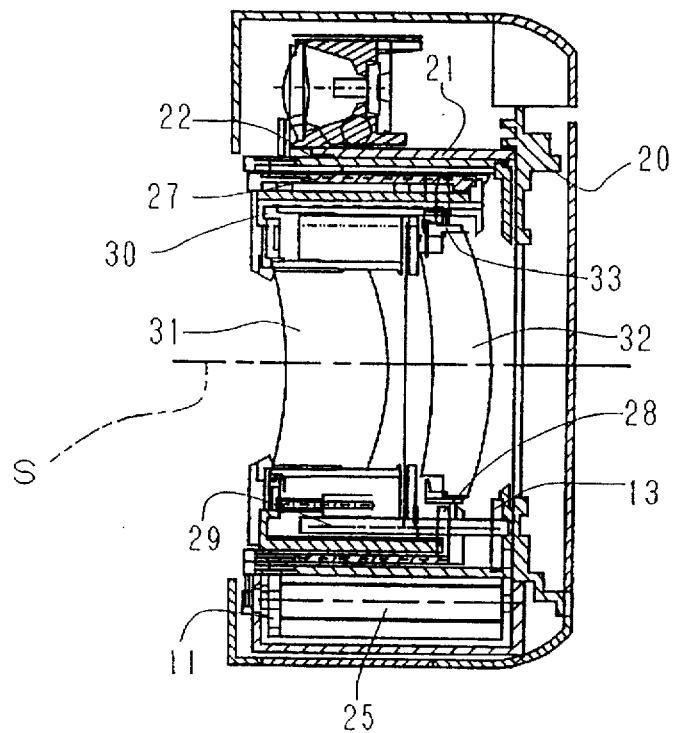
FIG. 4 is a sectional view taken along a vertical plane including the optical axis of the photographic lens, showing the inventive variable-focus photographic camera as the photographic lens has moved to its rearmost position.
Figure 5:
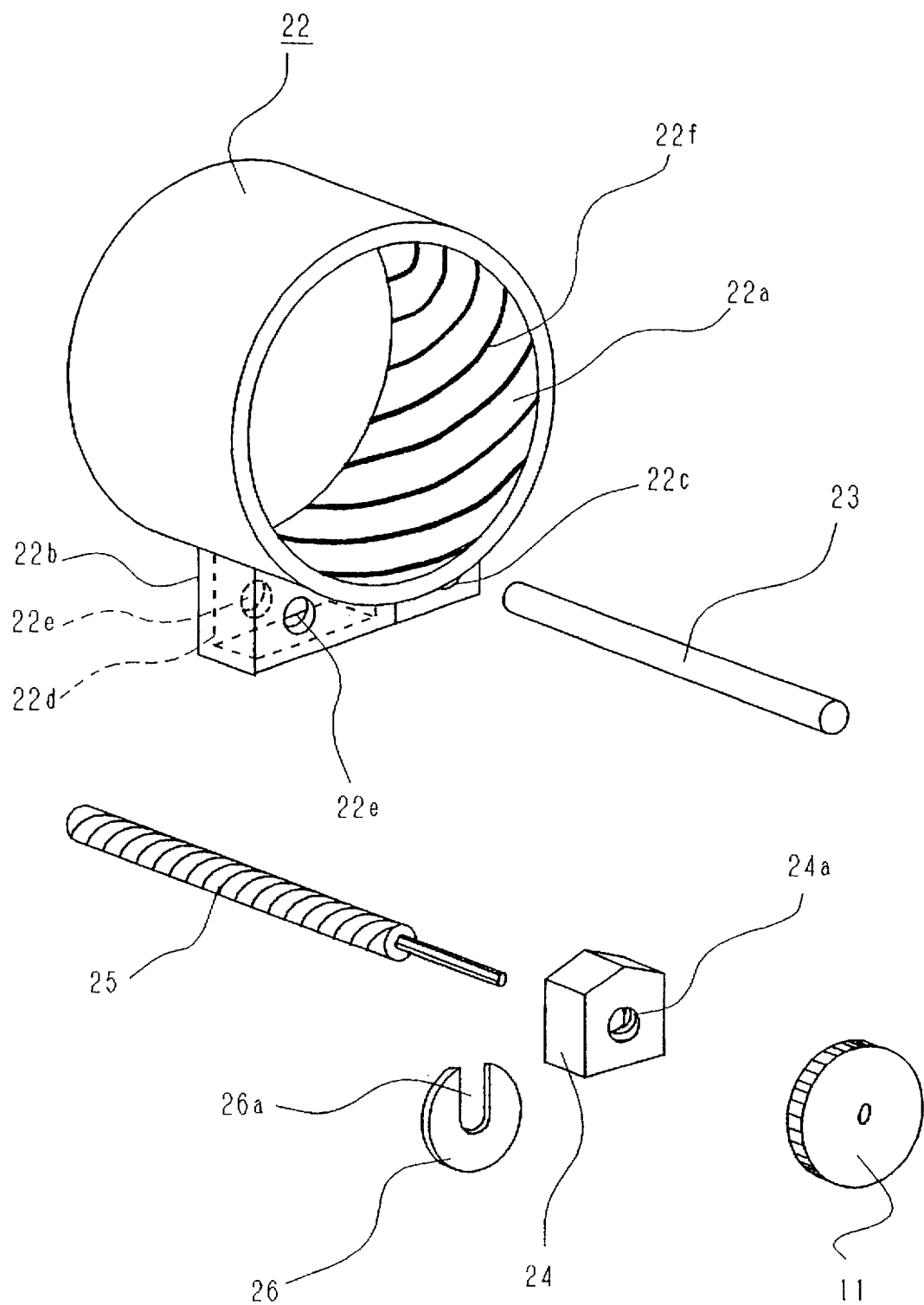
FIG. 5 is an exploded perspective view schematically showing a mechanism that constitutes a part of the photographic lens driving mechanism for the inventive variable-focus photographic camera and that is used to guide a first driving lens barrel of the photographic lens driving mechanism linearly back and forth.

Referring to FIGS. 3 and 4, the camera body 20 is provided with a stationary lens barrel 21 which, in turn, receives therein a first driving lens barrel 22 so as to be slidable along the optical axis S. As shown in FIG. 5, first driving lens barrel 22 comprises a main body 22a, a support block 22b formed on the outside of main body 22a, a guide hole 22c formed at one end of support block 22b and a guide rod 23 slidably inserted into and supported by guide hole 22c in the direction of the optical axis S, as shown by FIGS. 1, 2, and 5. A hollow nut holder 22d opening downward is formed at the other end of support block 22b and a pair of through-holes 22e are formed in mutually opposed surfaces of nut holder 22d extending orthogonally to the optical axis S. A nut member 24 is detachably inserted through the holder 22d so that a female screw 24a formed in nut member 24 may be aligned with through-holes 22e as nut member 24 is properly inserted into nut holder 22d.

A driving screw 25 is engaged with the female screw 24a of nut member 24 held by nut holder 22d. Driving screw 25 is oriented in parallel to the optical axis S, as shown in FIG. 2, and provided at one end thereof with first driving gear 11 fixed thereto so as to be rotated as first driving gear 11 is rotated. As will be apparent from FIG. 5, driving screw 25 is threaded into nut member 24 with interposition of a washer 26. Washer 26 is formed with a substantially U-shaped notch 26a so that washer 26 may be attached or detached even after driving screw 25 has been threaded into nut member 24.

Referring again to FIG. 5, first driving lens barrel 22 has a female helicoid 22f formed on its inner peripheral surface and receives therein a second driving lens barrel 27 having a male helicoid 27a formed on its outer peripheral surface and adapted to be threaded within female helicoid 22f. Referring now to FIG. 3, second driving lens barrel 27 is formed on its inner peripheral surface adjacent a rear end thereof with an internal gear 27b with which a follower gear 28, serving as a second gear, is engaged. Follower gear 28 is operatively associated with a coupling shaft 29 extending in parallel to the optical axis S in such a manner that follower gear 28 is rotated by splines or the like of coupling shaft 29 as the coupling shaft is rotated to slide follower gear 28 relative to said coupling shaft 29. Second driving gear 13 is fixed on a rear end of this coupling shaft 29 which is rotated as second driving gear 13 is rotated. Coupling shaft 29 has a portion to its rear end rotatably supported on a rear part of first driving lens barrel 22 and the remaining portion extending from its middle to its forward end rotatably as well as slidably supported on a rear part of second driving lens barrel 27.

Second driving lens barrel 27 has a female helicoid 27c formed on its inner peripheral surface and receives therein a movable lens barrel 30 which has a male helicoid 30a formed on its outer peripheral surface and adapted to be threaded with female helicoid 27c. Movable lens barrel 30 holds therein a front lens group 31 adapted to be moved synchronously with movable lens barrel 30.

A first key 36 functioning as a first linear driving member is fixed to the rear end of first driving lens barrel 22 so as to be moved back and forth together with first driving lens barrel 22 along the optical axis S. Similarly, a second key 37 functioning as a second linear driving member is operatively associated with the rear end of second driving lens barrel 27. Second driving lens barrel 27 is formed at its rear end with a flange 27d extending inward, and the rear end of second key 37 is operatively associated with the rear end of second driving lens barrel 27 in such a manner that the rear end of second key 37 loosely holds flange 27d. In this manner, second key 37 is moved back and forth along the optical axis S as second driving lens barrel 27 is moved back and forth and second driving lens barrel 27 is rotatable relative to second key 37.

Figure 6:
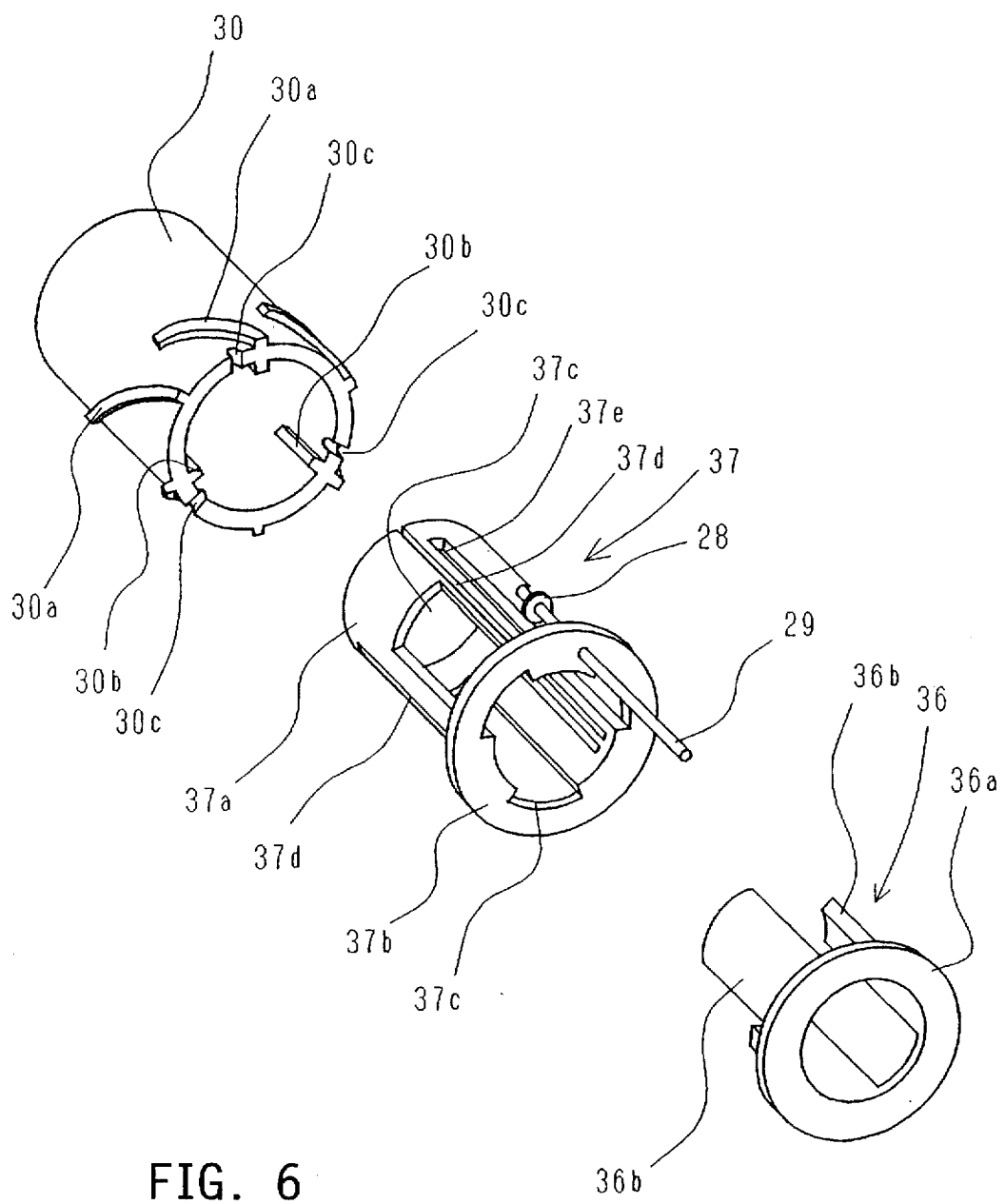
FIG. 6 is an exploded perspective view showing components of the photographic lens driving mechanism according to the invention.

Referring to FIG. 6, first key 36 comprises a centrally opening flange 36a destined to be locked by first driving lens barrel 22 and three key elements 36b extending forward from this flange 36a. Second key 37 comprises a cylindrical main body 37a, a flange 37b formed at the rear end of main body 37a and destined to be engaged with flange 27d of second driving lens barrel 27, and key receiving openings 37c extending from the inner side surface of flange 37b into main body 37a. The respective key elements 36b are loosely inserted into key receiving openings 37c. Thus, second key 37 is slidable along the optical axis S relative to first key 36 even after key elements 36b of first key 36 have been loosely inserted from the side of flange 37b into the respective key receiving openings 37c.

Movable lens barrel 30 is loosely positioned around main body 37a of second key 37. Referring to FIG. 6, main body 37a is formed with an appropriate number of guide slots 37d longitudinally extending in parallel to the optical axis S and the inner peripheral surface of movable lens barrel 30 is formed at its rear end with the corresponding number of guide ribs 30b adapted to be loosely inserted into the respective guide slots 37d. As a consequence, once guide ribs 30b of movable lens barrel 30 have been loosely inserted into the respective guide slots 37d of second key 37 and first key 36, second key 37 and movable lens barrel 30 are assembled together but movable back and forth relative to one another along the optical axis S and movable lens barrel 30 is prevented from rotating around the optical axis S.

Referring to FIG. 3, a rear lens group 32 is held by a rear lens group frame 33 which is, in turn, provided on its outer peripheral surface with interlocking pins 33a radially projecting therefrom. Second key 37 is formed, as shown in FIG. 6, with guide slots 37e extending in parallel to the optical axis S, into which interlocking pins 33a are loosely inserted. Interlocking pins 33a have their forward ends loosely inserted into cam grooves (not shown) formed on the inner peripheral surface of second driving lens barrel 27. In this manner, a distance by which rear lens group 32 moves as second driving lens barrel 27 rotates is controlled by the interlocking pins 33a being guided along the cam grooves. Consequently, second driving lens barrel 27 is guided by guide slots 37e so as to move along the optical axis S and thereby rear lens group 32 moves by a predetermined distance along the optical axis S. The distance by which rear lens group 32 moves is different from the distance by which movable lens barrel 30 moves. Accordingly, front lens group 31 and rear lens group 32 move along the optical axis S with a predetermined optical relationship maintained between these two lens groups 31 and 32. Referring to FIG. 6, the rear end of movable lens barrel 30 has notches 30c formed at locations aligned with guide slots 37e and adapted to receive the forward ends of interlocking pins 33a.

The embodiments of the inventive variable-focus photographic camera as described above operate in the manner described below.

FIG. 3 shows the camera with front lens group 31 and rear lens group 32 moved to their foremost positions. FIG. 4 shows the camera with these two lens groups moved to their rearmost positions. Referring to FIG. 4, when electric motor 6 is energized and a driving force is transmitted by gear train 8 to lens barrel driving gear 9, rotation of lens barrel driving gear 9 causes first driving gear 11 engaged with lens barrel driving gear 9 to rotate and, in consequence, driving screw 25 also rotates in the same direction as first driving gear 11, since first driving gear 11 is integrally fixed to driving screw 25. Rotation of driving screw 25 causes nut member 24 to move forth and first driving lens barrel 22 also moves forth in synchronism, since nut member 24 is threaded with driving screw 25 and nut member 24 is received by nut holder 22d of first driving lens barrel 22 which is, in turn, guided by guide rod 23. In addition, first key 36 fixed to the rear end of first driving lens barrel 22 also moves forth as first driving lens barrel 22 moves forth.

Driving force transmission gear 12 is also in engagement with lens barrel driving gear 9, and therefore, energization of electric motor 6 causes driving force transmission gear 12 to rotate. As a result, second driving gear 13 which is in engagement with driving force transmission gear 12 simultaneously rotates. Both driving force transmission gear 12 and second driving gear 13 are provided on the rear end of first driving lens barrel 22, so they move forth together with first driving lens barrel 22. During this movement, driving force transmission gear 12 and lens barrel driving gear 9 are reliably maintained in engagement with each other since each tooth of lens barrel driving gear 9 has a thickness substantially defined by a full length of its shaft and extending in parallel to the optical axis S. Coupling shaft 29 rotates synchronously with second driving gear 13 since second driving gear 13 is integrally fixed to coupling shaft 29, and follower gear 28 operatively associated with coupling shaft 29 also synchronously rotates. Follower gear 28 is in engagement with internal gear 27b formed on the inner peripheral surface of second driving lens barrel 27 which is rotatably received by first driving lens barrel 22. Accordingly, second driving lens barrel 27 rotates around the optical axis S as follower gear 28 rotates. Second driving lens barrel 27 is operatively associated by means of helicoids 27a and 22f, respectively, with first driving lens barrel 22 and second driving lens barrel 27 rotatably relative to first driving lens barrel 22. Consequently, second driving lens barrel 27 moves forth relative to first driving lens barrel 22. Second key 37 operatively associated with the rear end of second driving lens barrel 27 is operatively associated also with first key 36, so second key 37 moves forth without rotation relative to first key 36 synchronously with second driving lens barrel 27. This means that the second driving lens barrel 27 and second key 37 move forth further than first driving lens barrel 22 and first key 36, respectively. Follower gear 28 slidably moves forth along coupling shaft 29 together with second driving lens barrel 27.

Movable lens barrel 30 is operatively associated by means of helicoids 30 and 27c, respectively, with second driving lens barrel 27 while movable lens barrel 30 is operatively associated by means of guide ribs 30b and guide slots 37d, respectively, with second key 37 adapted to move forth in the direction of the optical axis S. Accordingly, rotation of second driving lens barrel 27 causes movable lens barrel 30 to move forth relative to second driving lens barrel 27. Front lens group 31 also moves forth together with movable lens barrel 30 since front lens group 31 is held by movable lens barrel 30. Being operatively associated with second key 37 and second driving lens barrel 27, rear lens group 32 is guided along guide slots 37e so as to move forth by a distance controllably given by rotation of second driving lens barrel 27 until front lens group 31 and rear lens group 32 reach their foremost positions, as shown in FIG. 3. Front lens group 31 and rear lens group 32 move forth with a predetermined optical relationship being maintained therebetween, and the power varies as movable lens barrel 30 moves forth.

When, from the position shown in FIG. 3, the output shaft of electric motor 6 rotates in the reverse direction, the direction in which lens barrel driving gear 9 rotates is also reversed with respect to the direction in which this gear 9 rotated in the previous operation as described above. Consequently, first driving lens barrel 22 moves back relative to stationary lens barrel 21, second driving lens barrel 27 moves back relative to first driving lens barrel 22, and movable lens barrel 30 moves back relative to second driving lens barrel 27 until front lens group 31 and rear lens group 32 reach their rearmost positions as shown in FIG. 4.

In this embodiment, electric motor 6 is provided in the camera body at a lower corner thereof so that it may be spaced from photographic lens 1 as far as possible. When a path along which a driving force is transmitted from electric motor 6 to photographic lens 1 is constructed by a gear train, the location of electric motor 6 as mentioned above allows gear train 8 to be arranged substantially in a common plane. As an advantageous consequence, a thickness or depth of a space occupied by elements of the transmission path as viewed in the direction of the optical axis S can be significantly reduced and thereby a thickness of the camera can be correspondingly reduced. In addition, the location of electric motor 6 is adequately spaced from control circuits arranged in the proximity of the viewfinder for various operations such as autofocus and autoexposure, so these control circuits are free from any adverse effects due to noises generated from electric motor 6 and the operations such as autofocus and autoexposure can be reliably performed.

The electric motor 6 is preferably placed below dry battery 4 and main capacitor 5 making a part of the strobe circuit. Such an arrangement is advantageous also in that the camera can be miniaturized without any increase in its height.

Figure 7:
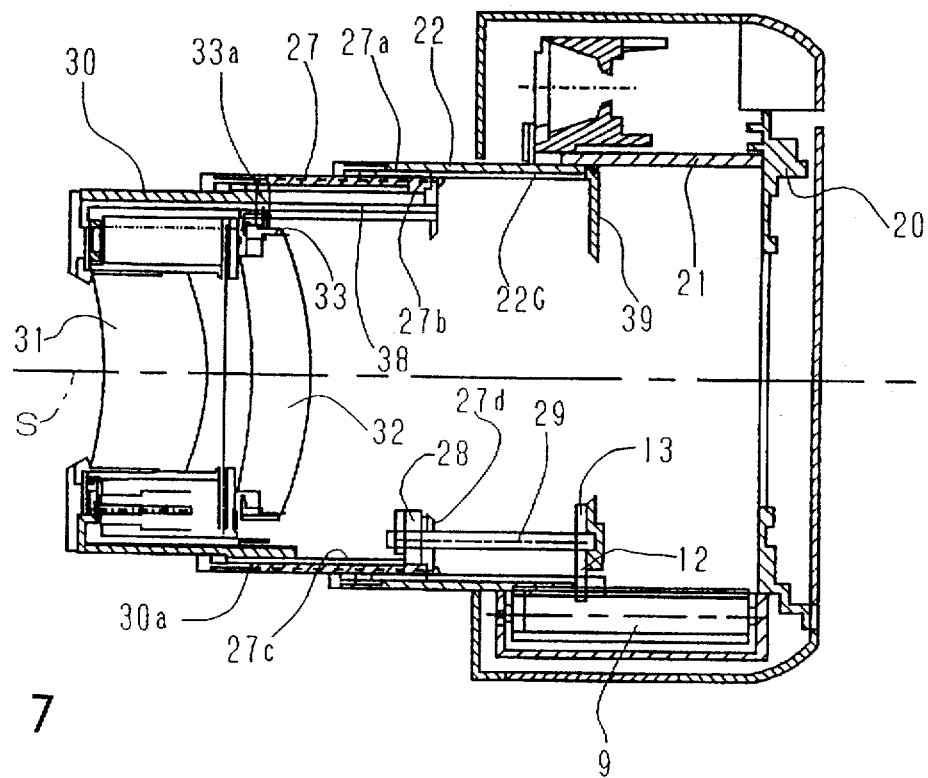
FIG. 7 is a sectional view corresponding to FIG. 3, showing an alternative embodiment of the guide mechanism for the movable lens barrels.
Figure 8:
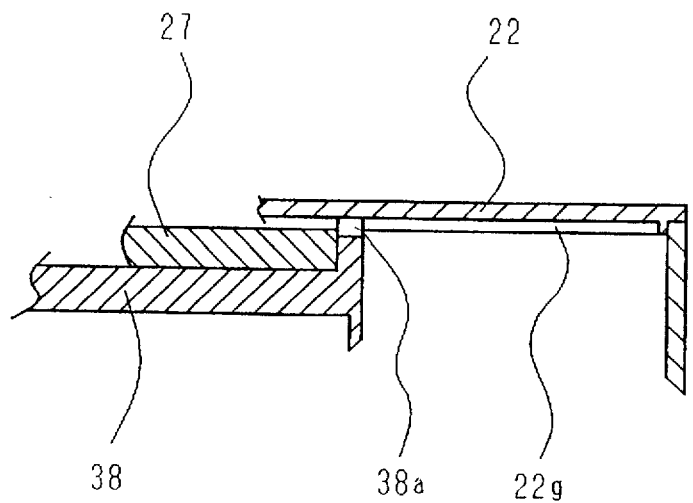
FIG. 8 is a sectional view showing, in an enlarged scale, the components shown in FIG. 7 as partially cut-out.

Referring now to FIGS. 7 and 8, an alternative embodiment of the mechanism adapted to guide the back and forth movement of movable lens barrel 30 is described. It should be understood that the parts similar to those in the embodiment shown by FIGS. 1 through 6 will be designated by the similar reference numerals, respectively, and not repetitiously described hereinafter. FIG. 8 is a sectional view showing a part of first driving lens barrel 22 in an enlarged scale. As shown, first driving lens barrel 22 is formed on its inner peripheral surface with, in addition to female helicoid 22f, an appropriate number of guide grooves 22g serving to guide a guide key 38 in parallel to the optical axis. Guide key 38 is operatively associated with movable lens barrel 30 in a manner similar to second key 37 according to the previously-described embodiment and formed at its rear end with guide ribs 38a destined to be loosely inserted into guide grooves 22g. Once having been loosely inserted into the respective guide grooves 22g, guide ribs 38a prevent guide key 38 from rotating around its own axis and simultaneously guide this guide key 38 so as to move back and forth in the direction of the optical axis. It should be understood that guide slots 37c formed in second key 37 according to the previously-described embodiment are unnecessary for this guide key 38. The rear end of guide key 38 is operatively associated with second driving lens barrel 27 so that guide key 38 may move back and forth together with second driving lens barrel 27 in the direction of the optical axis. An annular masking plate 39 is mounted on the rear end of first driving lens barrel 22 in order to avoid a phenomenon of flare due to light coming from an object to be photographed through the photographic lens.

According to the construction shown by FIGS. 7 and 8, the second driving lens barrel 27 is operatively associated with first driving lens barrel 22 by means of their helicoids 27a and 22f, and moves back and forth in the direction of the optical axis as second driving lens barrel 27 is rotated by the driving force transmitted from electric motor 6, and guide key 38 also moves back and forth as second driving lens barrel 27 moves back and forth in the same direction as the direction in which second driving lens barrel 27 moves. At this point in time, guide ribs 38a of guide key 38 are in loose engagement with guide grooves 22g formed on the inner peripheral surface first driving lens barrel 22, and therefore, guide key 38 linearly moves back and forth without rotation. More specifically, first key 36 provided in the embodiment previously-described and illustrated by FIGS. 1 through 6 is unnecessary for the embodiment illustrated by FIGS. 7 and 8 and the back and forth movement of guide key 38 equivalent to second key 37 in the previously described embodiment is guided by guide grooves 22g formed on the inner peripheral surface of first driving lens barrel 22. In this way, the number of parts can be decreased and the construction can be correspondingly simplified.

As will be apparent from the foregoing description, the photographic camera provided with the variable-focus lens system according to the invention allows the various components such as the battery source, the main capacitor, and the drive source used to drive, for example, the photographic lens system, to be efficiently arranged to obtain the desired miniaturization of the camera, since the battery and main capacitor are disposed on the same lateral side of a camera body while the drive source is provided in a space defined between the casing and the battery and main capacitor.

Furthermore, the elements defining the path along which the driving force is transmitted from the drive source to the photographic lens can be arranged substantially in a common plane, since the driving power source is provided at a location adequately remote from the photographic lens system. As a consequence, a thickness or depth, as viewed in the direction of the optical axis, of the space in which these transmitting elements are arranged can be significantly reduced and thereby this feature supports realization of a thin camera.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A variable-focus photographic camera comprising:
    a camera body covered by a camera casing;
    a photographic optical system adapted to operate in either a power varying mode or a focusing mode by moving a photographic lens back and forth in the direction of an optical axis;
    a strobe device;
    a battery source disposed within said camera casing on one lateral side of said camera body for providing power to components of the camera for the performance of various operations;
    a main capacitor coupled to said battery source and disposed adjacent said battery source within said camera casing on one side of said camera body, for providing power to said strobe device; and
    a drive source disposed in a space defined between said camera casing and said battery source and main capacitor, for driving said optical system back and forth in the direction of the optical axis.

2. The variable-focus photographic camera according to claim 1, wherein elements serving to transmit the driving force from said drive source to said photographic optical system have their supporting shafts arranged in parallel to the optical axis of said photographic optical system.

3. The variable-focus photographic camera according to claim 2, wherein said elements for transmission are implemented in the form of a gear train.

4. The variable-focus photographic camera according to claim 3, wherein said source battery and said main capacitor are disposed outside a spool chamber of the camera body.

5. The variable-focus photographic camera according to claim 1, wherein said source battery and said main capacitor are disposed outside a spool chamber of the camera body.

6. The variable-focus photographic camera according to claim 2, wherein said source battery and said main capacitor are disposed outside a spool chamber of the camera body.

7. The variable-focus photographic camera according to claim 1, wherein said source battery and said main capacitor are disposed outside a patrone chamber of the camera body.

8. The variable-focus photographic camera according to claim 2, wherein said source battery and said main capacitor are disposed outside a patrone chamber of the camera body.

9. The variable-focus photographic camera according to claim 3, wherein said source battery and said main capacitor are disposed outside a patrone chamber of the camera body.

10. A variable-focus photographic camera comprising:
    a camera body covered by a camera casing;
    a photographic optical system adapted to operate in either a power varying mode or a focusing mode by moving a photographic lens in the direction of an optical axis;
    a strobe device;
    a battery source disposed within said camera casing on one lateral side of said camera body for providing power to components of the camera for the performance of various operations;
    a main capacitor coupled to said battery source and disposed adjacent said battery source within said camera casing on one side of said camera body, for providing power to said strobe device; and
    a drive source disposed in a space within said camera casing below said battery source and main capacitor, for driving said optical system back and forth in the direction of the optical axis.

11. The variable-focus photographic camera according to claim 10, wherein elements serving to transmit the driving force from said drive source to said photographic optical system have their supporting shafts arranged in parallel to the optical axis of said photographic optical system.

12. The variable-focus photographic camera according to claim 11, wherein said elements for transmission are implemented in the form of a gear train.

13. The variable-focus photographic camera according to claim 12, wherein said source battery and said main capacitor are disposed outside a spool chamber of the camera body.

14. The variable-focus photographic camera according to claim 10, wherein said source battery and said main capacitor are disposed outside a spool chamber of the camera body.

15. The variable-focus photographic camera according to claim 11, wherein said source battery and said main capacitor are disposed outside a spool chamber of the camera body.

16. The variable-focus photographic camera according to claim 10, wherein said source battery and said main capacitor are disposed outside a patrone chamber of the camera body.

17. The variable-focus photographic camera according to claim 11, wherein said source battery and said main capacitor are disposed outside a patrone chamber of the camera body.

18. The variable-focus photographic camera according to claim 12, wherein said source battery and said main capacitor are disposed outside a patrone chamber of the camera body.

19. A variable-focus photographic camera comprising:
- a camera body covered by a camera casing;
- a photographic optical system adapted to operate in either a power varying mode or a focusing mode by moving a photographic lens back and forth in the direction of an optical axis;
- a strobe device;
- a battery source disposed within said camera casing on one lateral side of said camera body for providing power to components of the camera for the performance of various operations;
- a main capacitor coupled to said battery source and disposed adjacent said battery source within said camera casing on one side of said camera body, for providing power to said strobe device; and
- a drive source disposed in a space within said camera casing above said battery source and main capacitor, for driving said optical system back and forth in the direction of the optical axis.

20. The variable-focus photographic camera according to claim 19, wherein elements serving to transmit the driving force from said drive source to said photographic optical system have their supporting shafts arranged in parallel to the optical axis of said photographic optical system.

21. The variable-focus photographic camera according to claim 20, wherein said elements for transmission are implemented in the form of a gear train.

22. The variable-focus photographic camera according to claim 21, wherein said source battery and said main capacitor are disposed outside a spool chamber of the camera body.

23. The variable-focus photographic camera according to claim 19, wherein said source battery and said main capacitor are disposed outside a spool chamber of the camera body.

24. The variable-focus photographic camera according to claim 20, wherein said source battery and said main capacitor are disposed outside a spool chamber of the camera body.

25. The variable-focus photographic camera according to claim 19, wherein said source battery and said main capacitor are disposed outside a patrone chamber of the camera body.

26. The variable-focus photographic camera according to claim 20, wherein said source battery and said main capacitor are disposed outside a patrone chamber of the camera body.

27. The variable-focus photographic camera according to claim 21, wherein said source battery and said main capacitor are disposed outside a patrone chamber of the camera body.

* * * * *